March 1, 1955  A. MOOSER  2,702,992
FREEZING APPARATUS FOR PRODUCTION OF ICE CREAM
Filed March 13, 1951  2 Sheets-Sheet 1
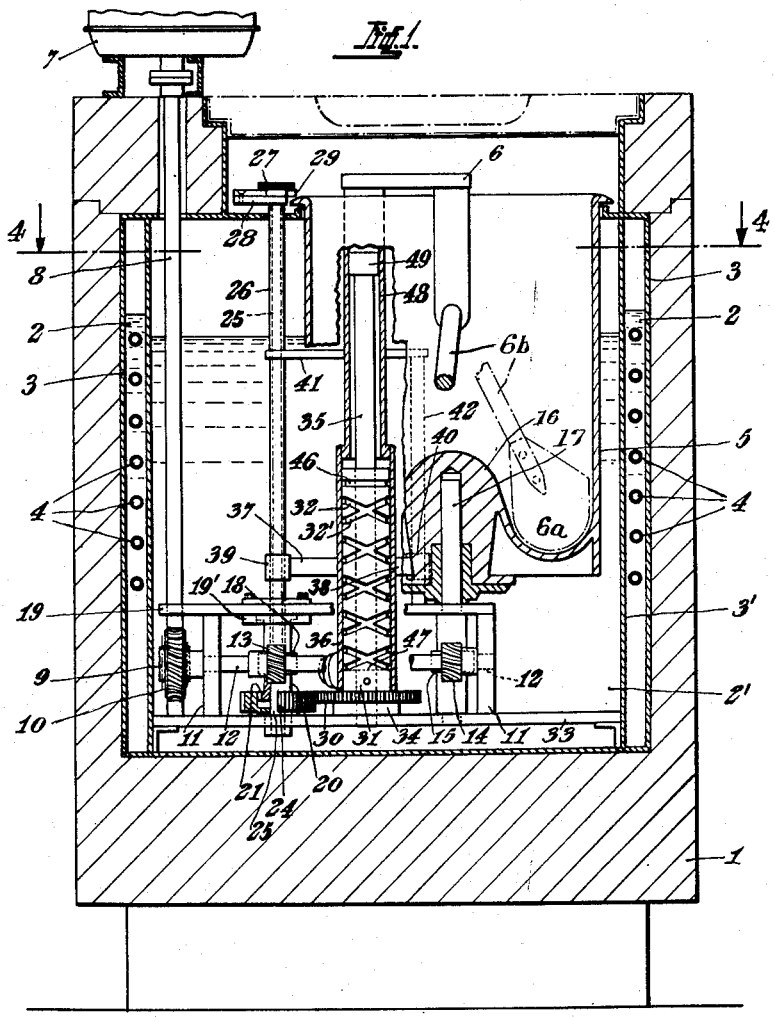
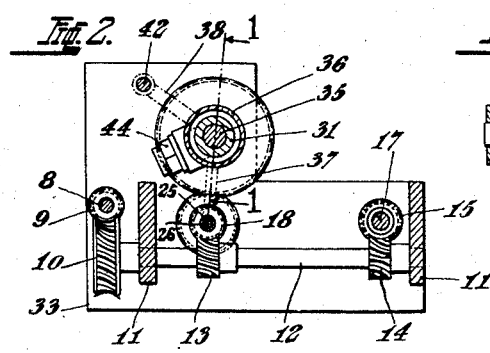
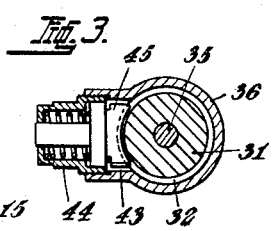
INVENTOR:
ALFRED MOOSER March 1, 1955 A. MOOSER 2,702,992
FREEZING APPARATUS FOR PRODUCTION OF ICE CREAM
Filed March 13, 1951 2 Sheets-Sheet 2

INVENTOR.
ALFRED MOOSER
BY

United States Patent Office 2,702,992
Patented Mar. 1, 1955

2,702,992

FREEZING APPARATUS FOR PRODUCTION OF ICE CREAM

Alfred Mooser, Bern, Switzerland

Application March 13, 1951, Serial No. 215,268

Claims priority, application Switzerland March 14, 1950

8 Claims. (Cl. 62—114)

This invention relates to a freezing apparatus for producing ice cream, such as fruit ices, ice cream of various flavors or the like. The freezing apparatus comprises a tank which accommodates evaporation tubes for a cooling agent circulating system, which contains a cooling liquid, and a rotatable refrigerating drum in part immersed in said liquid and provided with a mobile scraping spatula or stirrer.

Freezing apparatus for the production of ice cream and the like, known so far, have at least some parts of the spatula drive or of the gear serving for the transmission of the drive upon the spatula disposed in the space situated axially above the refrigerating drum. Those apparatus have the disadvantages firstly that parts of the spatula drive or gear reduce the accessibility to the drum aperture and to its contents and secondly that drops of lubricant from said drive can fall from such moving parts easily when disposed above the drum into the ice cream contained therein.

The freezing apparatus according to the invention avoids the above mentioned disadvantages in that the drive shaft for the spatula is disposed out of the range situated axially above the refrigerating drum and that the gears for transmission of motion from the drive shaft to the spatula is located in that part of the tank which contains the cooling liquid.

These and other features of the invention will more fully appear from the following detailed description of a specific embodiment of a freezing apparatus illustrated in the accompanying drawings, by way of example, in which Fig. 1 shows an axial section through the refrigerating drum and the tank, taken along line 1—1 in Fig. 2 with the gearing partly shown in a side view and partly in vertical section.

Fig. 2 is a top view of the gearing,

Fig. 3 shows a detail of the spatula drive, and

Figure 4:
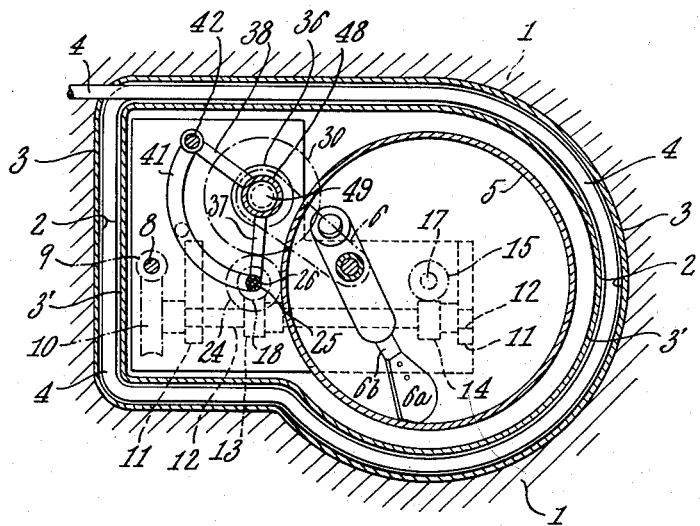
Fig. 4 is a top sectional view of the apparatus taken along line 4—4 of Fig. 1.

The casing 1 of the freezing apparatus for the production of ice cream comprises a tank 3 which is partly filled with a cooling liquid 2, for example brine or cooling oil. The tank 3 accommodates evaporation tubes 4, for a cooling agent circulating system (not shown) and an inner tank 3' which contains a cooling liquid 2' and a rotatable refrigerating drum 5. A wall scraping spatula of known shape 6a, extends from above on arms 6 and 6b into the refrigerating drum 5, and the arm 6 being adapted to move the spatula up and down in the direction of the drum axis. In Fig. 1 the arm 6b and spatula 6a are shown rotated axially of drum 5, for greater clarity. Along the wall of the drum the evaporation tubes 4 surround the inner tank 3' and are provided to cool the liquid 2 contained in the outer tank 3. The liquid 2 then cools the inner tank 3' and hereby indirectly the liquid 2', the refrigerating drum 5 and its contents.

An electric motor 7 is disposed on the top of the casing 1, which motor serves to drive the drum 5 and the spatula. A drive shaft 8 extends from the motor 7 into the inner tank 3' and carries at its lower end a worm 9 which engages a worm gear 10 of a gear shaft 12, journalled in a gear frame 11, which is located on the bottom of the tank 3' partly below the drum 5. Two worms 13 and 14 are mounted on the gear shaft 12, the latter of which is in gear with a worm wheel 15 fixed on the drum shaft 17 which is vertically journalled in the gear frame 11 and is rigidly connected to the bottom nave 16 of the drum 5. The worm 13 of the shaft 12 is in gear with a worm wheel 18 fixed on a vertical hollow shaft 20 which is journalled with its upper flange-like end on an annular disk 19' secured to a cover plate 19 of the gear frame 11. The shaft 20 has at the circumference of its lower end two coupling noses 21 which can engage in corresponding grooves 22 at the inwardly extending edge 23 of a cup-shaped coupling gear wheel 24 which can be placed into coupled or uncoupled position by axial shifting. For this purpose, the coupling gear wheel 24 is fixed on the lower end of a rod 25 which extends upwards through the hollow shaft 20, the cover plate 19 and a bearing tube 26 mounted on the latter, beyond the upper edge of the refrigerating drum 5. A hand wheel 27 is secured to the upper end of the rod 25. The upper end of the bearing tube 26 carries an arm 28 having pivoted on its free end a pawl 29 which can be swung below the nave of the hand wheel 27 in order to hold the coupling gear wheel 24 in uncoupled position.

The coupling gear wheel 24 is in gear with a spur wheel 30 mounted at the lower end of a hollow spindle 31 having a double screw thread 32, 32' crossing several times. The spindle 31 is internally journalled on a vertical axle 35 which has a flange 34 at its lower end and is secured therewith on the bottom plate 33 of the gear frame 11. The spindle 31 is surrounding by a sliding tube 36 which is axially shiftable on the spindle and has two arms 37 and 38 provided each with a cylindrical guide bushing 39 and 40, respectively, extending parallel to the axis of the slide tube 36. The guide bushing 39 is slidably mounted on the bearing tube 26, while the guide bushing 40 is slidably mounted on a guide bar 42 which is secured to the frame or cover plate 19 and connected to the bearing tube 26 by means of an arc-shaped stiffening arm 41. Near the lower end of the slide tube 36 the same is provided with a slot 43 for the passage of a dog 45 which engages into the screw thread 32, 32' of the spindle 31 (Fig. 3). The dog 45 is pivotally mounted in a bushing 44, secured to the slide tube 36 and has an elongated end portion shaped to fit the inner cylindrical surface of the screw threads, so that the dog can not enter from one screw thread into the other at the crossing points of both screw threads 32 and 32', but merely at their respective upper or lower ends where the two screw threads are interconnected by a circumferential groove 46 or 47, respectively, running over half of the circumference of the spindle and permitting the passage of dog 45 from one screw thread into the other. When the spindle 31 rotates, the dog 45 engages the screw threads 32, 32' and imparts to the slide tube 36 (which is not allowed to rotate) an axial up and down movement. A tube 48 extending over the top edge of the drum 5 is coaxially secured to the top end of the slide tube 36 and is guided on a collar 49 provided at the top end of the axle 35. The tube 48 has an arm 6 which reaches into the drum 5 and carries arm 6b the spatula 6a, these parts performing an up and down movement together with the slide tube 36.

The spatula 6a serves to scrape the ice cream frozen on the inner wall of the refrigerating drum 5 off this wall. The spatula may be adapted to scrape during its downward movement and to convey ice cream onto the drum wall during the upward movement. These ice cream scraping and returning actions of the spatula are effectuated in hitherto known spatula devices by mechanical means imitating to a certain extent the manual spatula operation, performed before, when producing ice cream in a rotating refrigeration drum.

The hand wheel 27 permits raising or lowering the spatula by hand at will, when the coupling 21, 22 is disengaged.

The cooling liquid, e. g. ethylene glycol, in the inner tank 3' simultaneously serves as a cold transmission medium and as a lubricant for the gears. In the outer tank, brine or a diluted cooling liquid can be used as a cold transfer agent.

Having thus described the invention, what is claimed as new and desired to be secured by Letters Patent, is:

1. A freezing apparatus for the production of ice cream or the like, comprising a main tank for holding a cooling liquid therein, heat removing means mounted in said tank for cooling the cooling liquid in the latter, a refrigerating drum having an open end and rotatably mounted in said tank and adapted to receive a substance to be converted into ice cream; a spatula overhanging the open end of said drum and mounted for extension into and for movement axially of said drum, and drive means common to said drum and said spatula, said drive means being substantially located laterally of and below said refrigerating drum, said drive means further including a drive shaft, gear means mounted within said tank and connected to said drive shaft, means operatively connecting said gear means with said spatula for transmitting motion to the latter, and transmission means mounted within said tank and connecting said drive shaft to said refrigerating drum for imparting rotation to the latter relative to said spatula.

2. A freezing apparatus as claimed in claim 1, wherein the gear means is disposed below the refrigerating drum.

3. A freezing apparatus as claimed in claim 1, wherein the cooling liquid in the tank is a lubricant for lubricating the gear means.

4. A freezing apparatus as claimed in claim 1, wherein the heat removing means includes evaporating tubes surrounding the tank containing the gear means.

5. A freezing apparatus as claimed in claim 6, wherein an outer tank is disposed around the main tank, and the evaporating tubes are disposed in the outer tank and adapted to be immersed in a cooling medium which wets the main tank containing the gear means.

6. The combination, in a freezing apparatus having a hollow refrigerating drum with an open end for producing ice cream and like substance therein, of a spatula freely overhanging the open end of said drum and extending into said drum, with drive means including a shaft operatively connected to said spatula, means associated with said shaft to move said spatula in upward and downward direction within said drum, and further means associated with said drum to rotate same relative to said spatula.

7. A freezing apparatus for producing ice cream and like mass, comprising a tank for containing a cooling liquid, means for cooling said liquid in said tank, a rotatable refrigerating drum having an open end for receiving said mass to be frozen, said drum extending partly into said cooling liquid, a driving shaft disposed outside of said drum, gear means in operative connection with said driving shaft and positioned in said tank for containing said cooling liquid, and a movable spatula support overhanging the open end of said drum and operatively connected with said gear means for actuation of said spatula relative to said rotatable drum.

8. A freezing apparatus for the production of ice cream and like substance; comprising a main tank for containing a refrigerant, a hollow refrigerating drum having an open end and rotatably mounted in said tank, a spatula freely overhanging the open end of said drum and extending thereinto, said spatula being disposed for substantially up and downward movement within said drum, and drive means common to said spatula and to said drum, said drive means extending into said tank and laterally and outwardly of said drum, said spatula being operatively connected to said drive means, whereby the space above said drum and adjacent said open end may be kept free for affording movements of said spatula within said drum, thereby preventing penetration of foreign matter from said drive means into said open drum end.

References Cited in the file of this patent

UNITED STATES PATENTS

| Number | Name | Date |
|---|---|---|
| 676,130 | Goodfellow | June 11, 1901 |
| 2,076,114 | Bethancourt | Apr. 6, 1937 |
| 2,085,542 | Neitzel | June 29, 1937 |
| 2,139,576 | Davis | Dec. 6, 1938 |
| 2,266,766 | Knight | Dec. 23, 1941 |
| 2,290,836 | McFerran | July 21, 1942 |
| 2,317,624 | Lindsey | Apr. 27, 1943 |
| 2,321,173 | Bemis | June 8, 1943 |
| 2,458,940 | Harless | Jan. 11, 1949 |
| 2,557,813 | Burton | June 19, 1951 |